US012731712B2

(12) United States Patent
Liu

(10) Patent No.: US 12,731,712 B2
(45) Date of Patent: Sep. 8, 2026

(54) HEAD-MOUNTED ADJUSTMENT DEVICE AND HEAD-MOUNTED DISPLAY APPARATUS

(71) Applicant: HUIZHOU TCL MOBILE COMMUNICATION CO., LTD., Huizhou (CN)

(72) Inventor: Wenwu Liu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 208 days.

(21) Appl. No.: 18/729,511

(22) PCT Filed: Jan. 5, 2023

(86) PCT No.: PCT/CN2023/070755
§ 371 (c)(1),
(2) Date: Jul. 17, 2024

(87) PCT Pub. No.: WO2023/142954
PCT Pub. Date: Aug. 3, 2023

(65) Prior Publication Data
US 2025/0095894 A1 Mar. 20, 2025

(30) Foreign Application Priority Data
Jan. 28, 2022 (CN) ......................... 202220242894.5

(51) Int. Cl.
*H01F 7/02* (2006.01)
*A45F 5/00* (2006.01)

(52) U.S. Cl.
CPC .............. *H01F 7/02* (2013.01); *A45F 5/1525* (2025.01)

(58) Field of Classification Search
CPC .......... H01F 7/02; A45F 5/1525; G02B 27/01
See application file for complete search history.

(56) References Cited

U.S. PATENT DOCUMENTS 10,019,964 B1 * 7/2018 Patel ........................ G01B 7/14
10,502,363 B2 * 12/2019 Edwards ................ F16M 13/04
(Continued)

FOREIGN PATENT DOCUMENTS

CN 207266238 U 4/2018
CN 207266239 U 4/2018
(Continued)

OTHER PUBLICATIONS

International Search Report in International application No. PCT/CN2023/070755, mailed on Feb. 20, 2023.
(Continued)

*Primary Examiner* — David M Upchurch
(74) *Attorney, Agent, or Firm* — PV IP PC; Wei Te Chung

(57) ABSTRACT

A head-mounted adjustment device includes a housing, a connecting rod, a first magnetic member, and a second magnetic member, and a strap. The housing includes an adjusting cavity and an adjusting opening. The connecting rod movably installed in the adjusting cavity moves in the direction close to or away from the adjusting opening. The first magnetic member installed at an end of the connecting rod moves synchronously with the connecting rod. The second magnetic member is located on one side of the first magnetic member close to the adjusting opening; parts of the first magnetic member and the second magnetic member facing each other are isotropic magnetic poles of each other. The strap having one end connected to the connecting rod, and another end extends out of the adjusting opening to expand and contract in a direction close to or away from the adjusting opening.

20 Claims, 7 Drawing Sheets

(56) References Cited

U.S. PATENT DOCUMENTS

| | | | | |
|---|---|---|---|---|
| 11,419,391 | B2 * | 8/2022 | Dong | F16H 19/04 |
| 2004/0244096 | A1 * | 12/2004 | Claro | A42B 1/22 2/195.2 |
| 2020/0133009 | A1 | 4/2020 | Forster et al. | |
| 2020/0226838 | A1 * | 7/2020 | Goergen | A63F 13/213 |

FOREIGN PATENT DOCUMENTS

| | | | |
|---|---|---|---|
| CN | 209070230 | U | 7/2019 |
| CN | 214311110 | U | 9/2021 |
| CN | 216696880 | U | 6/2022 |
| WO | 2019135209 | A1 | 7/2019 |

OTHER PUBLICATIONS

Written Opinion of the International Search Authority in International application No. PCT/CN2023/070755, mailed on Feb. 20, 2023.

* cited by examiner

HEAD-MOUNTED ADJUSTMENT DEVICE AND HEAD-MOUNTED DISPLAY APPARATUS

This application is a US national phase application based upon an International Application No. PCT/CN2023/070755, filed on Jan. 5, 2023, which claims the priority of Chinese Patent Application No. 202220242894.5, entitled “HEAD-MOUNTED ADJUSTMENT DEVICE AND HEAD-MOUNTED DISPLAY DEVICE”, filed on Jan. 28, 2022, the disclosure of which is incorporated herein by reference in its entirety.

FIELD OF THE DISCLOSURE

The present disclosure relates to a head-mounted display devices, and in particular, to a head-mounted adjustment device and a head-mounted display device.

BACKGROUND

Head-mounted display devices, such as virtual reality headsets, augmented reality headsets, and mixed reality headsets, typically include a device body that displays image information to the user and a wearing part that places the device body on the user’s head.

The wearing part usually includes of a strap or side arm that extends from both ends of the device body, and the head-mounted display device is worn behind the user’s head, with the strap or side arms on either side of the user’s head. Due to the different head circumferences of different users, in order to adapt to different users, it is necessary to adjust the length of the strap or the side arm to adjust the tightness of the head-mounted display device.

SUMMARY

Technical Problem

The conventional head-mounted display devices need to manually adjust the length of the strap or side arms, which is not conducive to user operation and affects the convenience of the head-mounted display devices.

Solution to Technical Problem

Technical Solution

One objective of an embodiment of the present disclosure is to provide a head-mounted adjustment device and a head-mounted display device to alleviate the above issue.

In a first aspect, according to an embodiment of the present disclosure, a head-mounted adjustment device is disclosed. The head-mounted adjustment device comprises:

- a housing, having an adjusting cavity and an adjusting opening connected to the adjusting cavity;
- a connecting rod, movably installed in the adjusting cavity, configured to move in the direction close to or away from the adjusting opening;
- a first magnetic member, installed at an end of the connecting rod to move synchronously with the connecting rod;
- a second magnetic member, installed in the housing, wherein the second magnetic member is at least partially located on one side of the first magnetic member close to the adjusting opening, wherein parts of the first magnetic member and the second magnetic member facing each other are isotropic magnetic poles of each other, so that the first magnetic member and the second magnetic member produce magnetic repulsion;
- a strap, having one end connected to the connecting rod, and another end extends out of the adjusting opening to expand and contract in a direction close to or away from the adjusting opening.

Optionally, the second magnetic member extends along a depth direction of the adjusting cavity, the first magnetic member is located on one side in a width direction of the second magnetic member, and a length direction of the first magnetic member is arranged at an angle with an extension direction of the second magnetic member.

Optionally, the second magnetic member is arranged in an arc shape in the extension direction, the first magnetic member is located on a concave arc side of the second magnetic member, and an activity trajectory shape of the first magnetic member is identical as an activity trajectory shape of the second magnetic member.

Optionally, the housing further comprises a partition plate installed in the adjusting cavity, and the partition plate separates the adjusting cavity into a first mounting cavity and a second mounting cavity; the connecting rod and the strap are positioned in the first mounting cavity, and the first magnetic member and the second magnetic member are located in the second mounting cavity; the partition plate is provided with a guiding groove, and the guiding groove extends along a moving direction of the connecting rod; and one end of the connecting rod extends into the second mounting cavity through the guiding groove for the first magnetic member to be connected.

Optionally, the first magnetic member is movably connected to the partition plate, and the second magnetic member is fixed to the partition plate.

Optionally, an extension direction of the guiding groove is parallel to the extension direction of the second magnetic member.

Optionally, the head-mounted adjustment device further includes a sliding pillar, connected to the first magnetic member. The partition plate is provided with a sliding groove, the sliding groove is parallel with the guiding groove, and the sliding pillar and the sliding groove are slidably fitted.

Optionally, the sliding pillar is connected to one side of the first magnetic member facing the partition plate, and the sliding post is connected with the first magnetic member by means of bonding.

Optionally, a number of the sliding grooves is two, the two sliding grooves are arranged on two sides in the width direction of the guiding grooves, and the number and positions of sliding posts correspond to the sliding grooves.

Optionally, the head-mounted adjustment device further includes a roller sleeve, capable of being rotatably sleeved on the sliding post to roll and cooperate with a groove wall of the sliding groove.

Optionally, the adjusting cavity has two partition plates, the partition plates separate the adjusting cavity into the first mounting cavity and two second mounting cavities, the first mounting cavity is located between the two second mounting cavities. The two second mounting cavities are provided with the first magnetic members and the second magnetic members, and the two partition plates are provided with the guiding grooves. The two ends of the connecting rod extend into the two second mounting cavities respectively through the two guiding grooves to be connected with the two first magnetic members respectively.

Optionally, the two second mounting cavities are respectively arranged at a top and a bottom of the adjusting cavity, and the two first magnetic members and the connecting rod play a role of mutual limiting, so that the connecting rod and the two first magnetic members are longitudinally fixed in the adjusting cavity.

Optionally, the housing is provided with two adjusting cavities and two adjusting openings, the two adjusting cavities are arranged along a length direction of the housing, and the two adjusting openings are arranged opposite to each other; each adjusting cavity is provided with the connecting rod, the first magnetic member and the second magnetic member; a number of the straps is two, and the two straps are respectively connected to the two connecting rods to expand and contract relative to the two adjusting openings respectively.

Optionally, the two adjusting openings are arranged at two ends in a length direction of the housing, and the two straps are respectively extensible through the two adjusting openings.

Optionally, the head-mounted adjustment device further comprises two friction-reducing pillars installed at the adjusting opening, the two friction-reducing pillars are arranged with an interval, and the straps are positioned between the two friction-reducing pillars.

Optionally, the friction-reducing pillars can be rotatably mounted at the adjusting opening.

Optionally, the adjusting cavity extends along a lateral extension direction of the housing, the adjusting opening is located at a lateral end of the housing, and the connecting rod extends along a width direction of the adjusting cavity and is capable of moving along a depth direction of the adjusting cavity.

Optionally, the first magnetic member and the second magnetic member are magnets.

Optionally, the second magnetic member is block-shaped and adjacent to the adjustment opening.

In a second aspect, according to an embodiment of the present disclosure, a head-mounted display device is disclosed. The head-mounted display device comprises the above-mentioned head-mounted adjustment device.

Beneficial Effect of Present Disclosure

Advantageous Effect

The head-mounted adjustment device according to an embodiment of the present disclosure could arrange a connecting rod, a strap, a first magnetic member and a second magnetic member in the housing, where the homogeneous magnetic poles of the first magnetic member and the second magnetic member are facing each other, and the strap and the first magnetic member are connected to the connecting rod. Thus, when the strap is pulled outward by a tensile force, the first magnetic member will move in the direction close to the adjustment opening along with the connecting rod. Since the second magnetic is at least partially located on the side of the first magnetic close to the adjusting opening, the second magnetic generates a repulsion force on the first magnetic member. When the strap is stretched outwards with a length for adapting the user's head, the tension on the strap is removed. At this time, the second magnetic member moves inwards under the action of repulsion and pulls the strap inward by means of a connecting rod. The outer end of the strap attaches to the body of the head-mounted adjustment device. When the strap is pulled inward, the head-mounted adjustment device works with the body of the device to clamp the user's head to automatically adapt to the user's head. After the device body and head-mounted adjustment device are clamped in place, the repulsion of the first magnetic member is balanced by the resistance experienced by the outer end of the strap, so that the head-mounted adjustment device and the device body are stably worn on the user's head. As a result, users can simply pull the strap out to a length larger than their head size when using the head-mounted display device. After the user wears the head-mounted display device, the strap will be tightened into the adjustment cavity under the action of magnetic repulsion to clamp the user's head. This allows the head-mounted display device to automatically adjust the tension after it is worn, which does not require a need for manual user intervention and improves the convenience of the head-mounted display device.

BRIEF DESCRIPTION OF THE DRAWINGS

Description of the Drawings

In order to more clearly illustrate the technical solution in the embodiment of the present disclosure, the accompanying drawings that need to be used in the description of the embodiment will be briefly described below. Obviously, the drawings described below are only some embodiments of the present disclosure, and other drawings may be obtained from those drawings on the basis of which a person skilled in the art may obtain without creative effort.

In order to understand the application and its beneficial effects more completely, the following is illustrated in conjunction with the accompanying drawings. Among them, the same label number in the description below indicates the same part.

Figure 1:
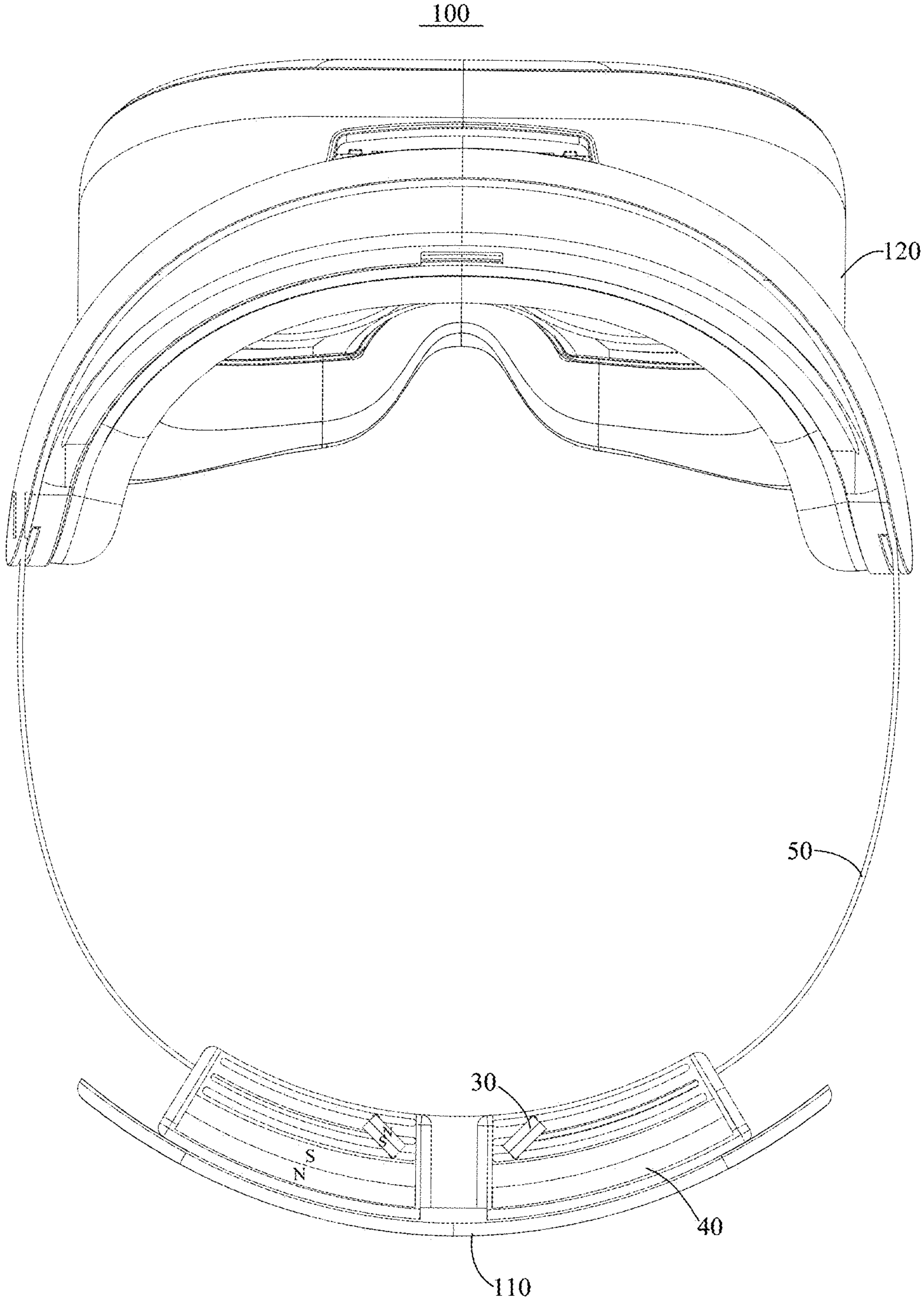

FIG. 1 is a top view of a head-mounted display device according to an embodiment of the present disclosure.

Figure 2:
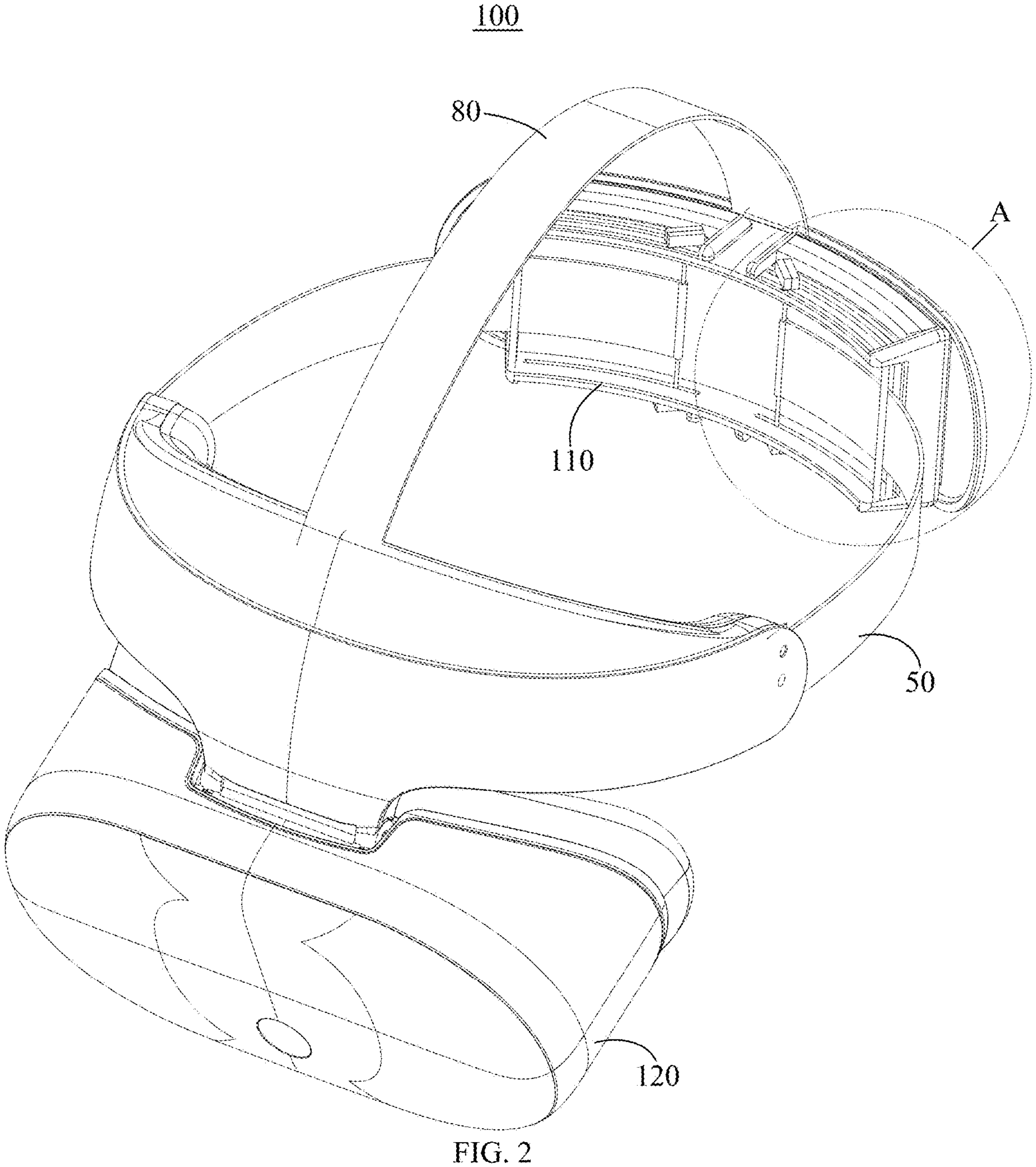

FIG. 2 is a diagram of a head-mounted display device according to an embodiment of the present disclosure.

Figure 3:
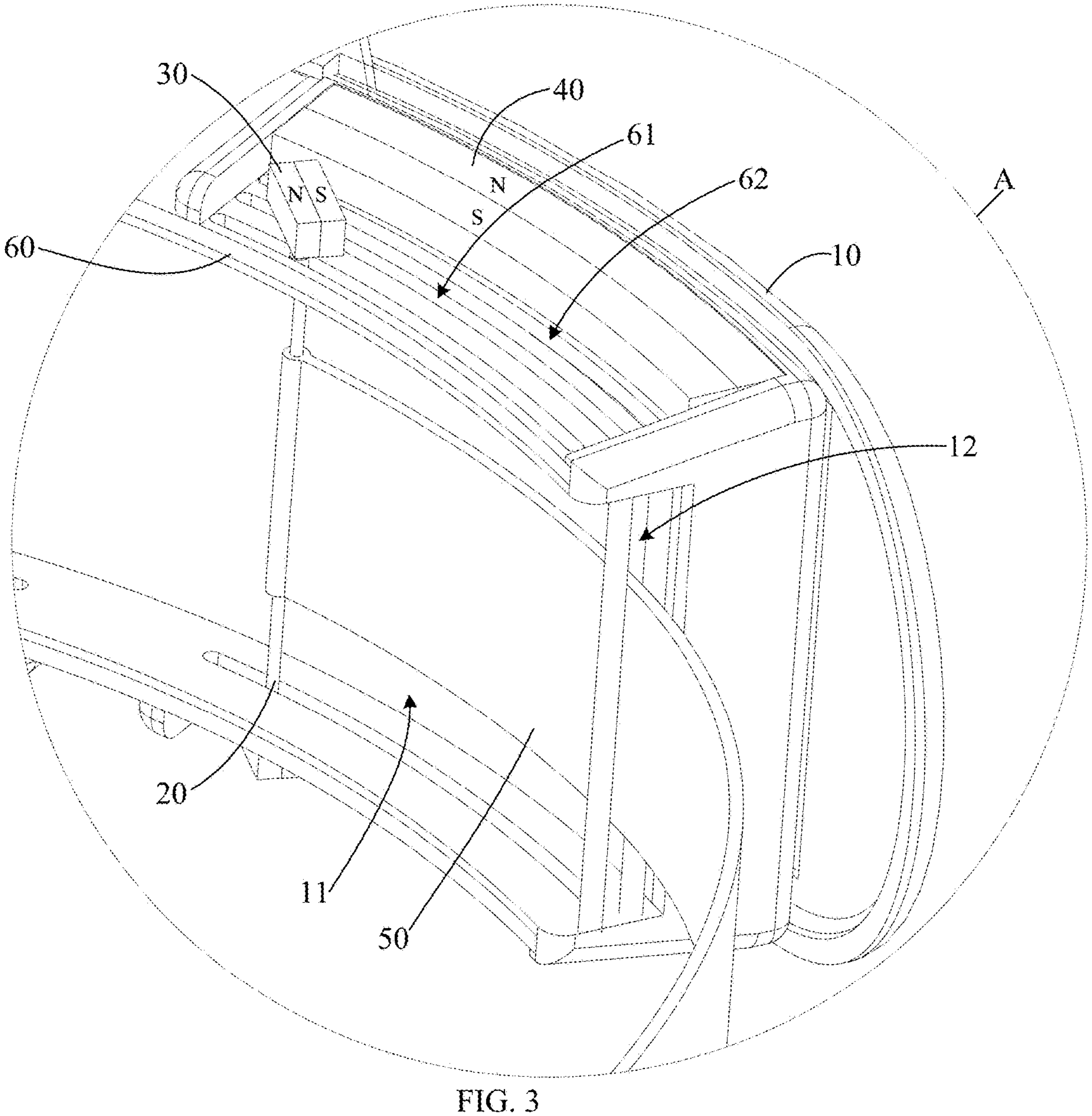

FIG. 3 is a diagram of a magnified structure of the part A of the head-mounted adjustment device shown in FIG. 2.

Figure 4:
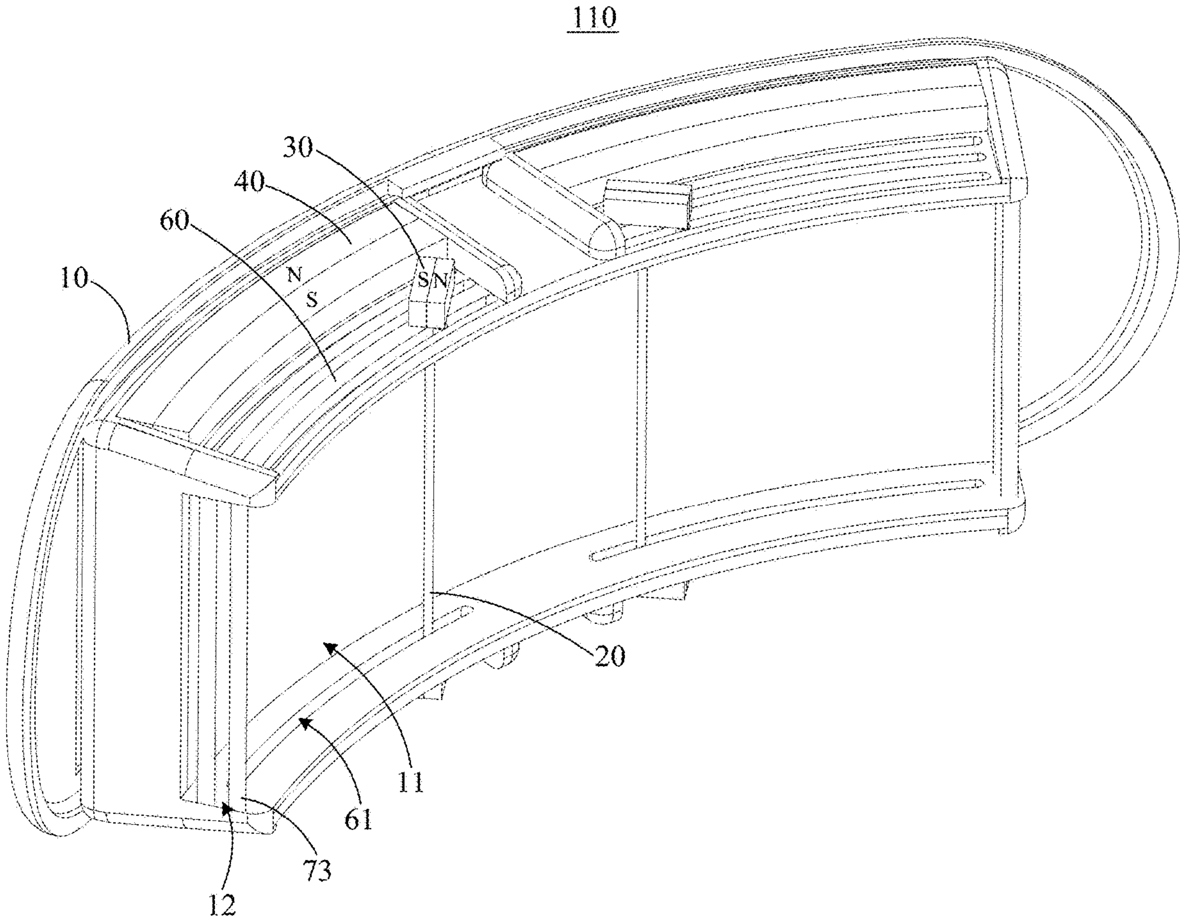

FIG. 4 is a diagram of a partial structure of a head-mounted adjustment device according to an embodiment of the present disclosure.

Figure 5:
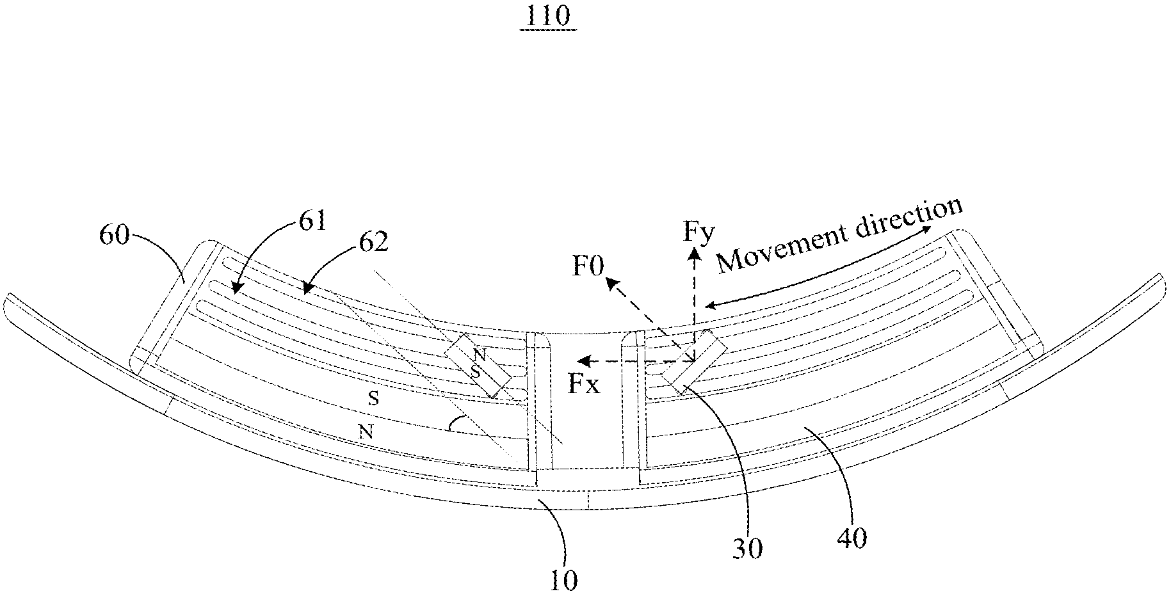

FIG. 5 is a top view of a head-mounted adjustment device according to an embodiment of the present disclosure.

Figure 6:
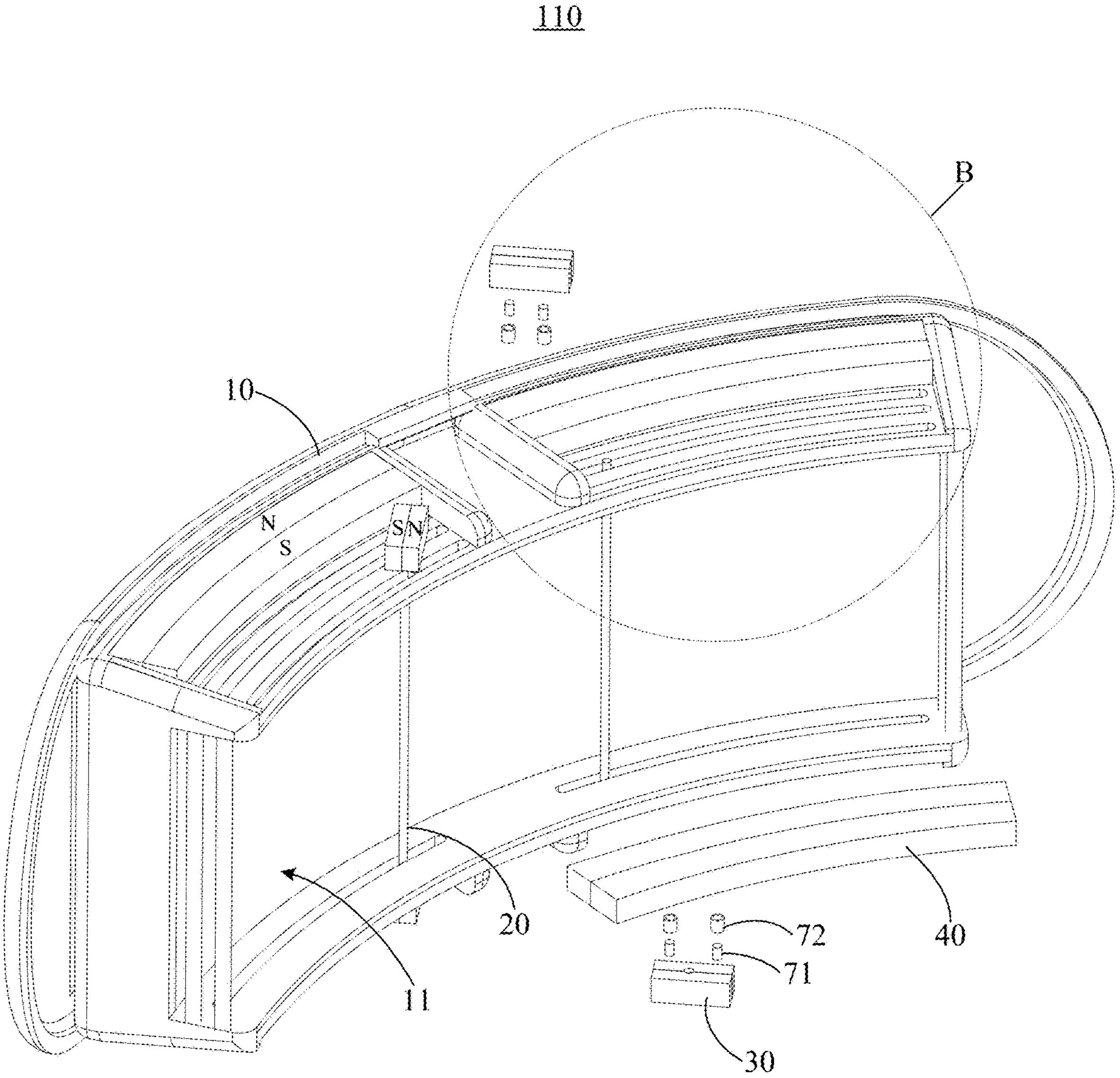

FIG. 6 is an exploded diagram of a partial structure of the head-mounted adjustment device according to an embodiment of the present disclosure.

Figure 7:
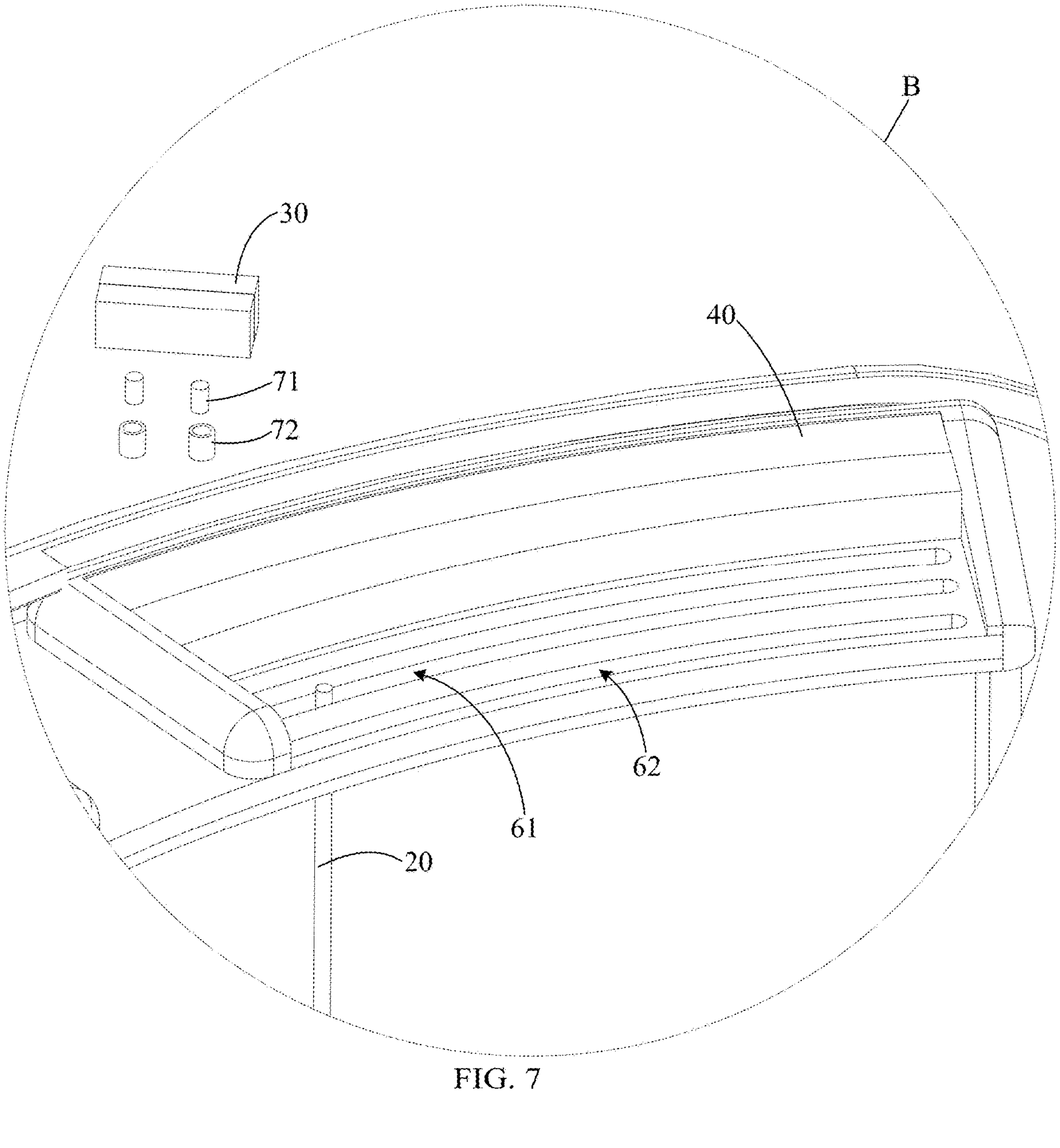

FIG. 7 is a diagram of a magnified structure of the part B of the head-mounted adjustment device shown in FIG. 6.

EMBODIMENT OF THE PRESENT DISCLOSURE

Detailed Description of the Present Disclosure

The technical solution in the embodiment of the present disclosure will be clearly and completely described below in conjunction with the accompanying drawings in the embodiment of the present disclosure. Obviously, the described embodiments are only some embodiments of the present disclosure, not all embodiments. Based on the embodiments in the present disclosure, all other embodiments obtained by a person skilled in the art without creative work fall within the scope of protection of the present disclosure.

According to an embodiment of the present disclosure provides a head-mounted adjustment device 110 and a head-mounted display device 100 to alleviate the inconvenience of the conventional head-mounted display device.

The head-mounted adjustment device 110 can be used in the head-mounted display device 100. Please refer to FIG. 1 and FIG. 2. FIG. 1 is a top view of a head-mounted display device according to an embodiment of the present disclosure. FIG. 2 is a diagram of a head-mounted display device according to an embodiment of the present disclosure. The head-mounted display device 100 can include the device body 120 and the head-mounted adjustment device 110. The strap 50 of the head-mounted adjustment device 110 is attached to the device body 120. The device body 120 is used for the user to wear on the eye to project an image to the user's eye. The head-mounted adjustment device 110 is used for the user to wear on the back of the head, so that the head-mounted adjustment device 110 and the device body 120 are clamped from the front and rear sides of the head through the expansion and contraction of the strap 50, such that the head-mounted display device 100 is firmly worn on the head. The head-mounted display device 100 is worn behind the head, and the strap 50 is on one side of the head. The head-mounted display device 100 may also include a top reinforcement band 80. One end of the top reinforcement band 80 is connected to the top of the head-mounted adjustment device 110 and the other end of the top reinforcement band 80 is connected to the top of the device body 120. After the head-mounted display device 100 is worn on the head, the top reinforcement band 80 will bypass the top of the user's head to form a support through the top of the user's head to the top reinforcement band 80, thereby forming a support for the head-mounted display device 100, so as to improve the wearing stability of the head-mounted display device 100.

In the following disclosure, the structure of the head-mounted adjustment device 110 will be illustrated in conjunction with the drawings.

Please refer to FIG. 3 and FIG. 4. FIG. 3 is a diagram of a magnified structure of the part A of the head-mounted adjustment device 110 shown in FIG. 2. FIG. 4 is a diagram of a partial structure of the head-mounted adjustment device 110 according to an embodiment of the present disclosure. The head-mounted adjustment device 110 comprises a housing 10, a connecting rod 20, a first magnetic member 30, a second magnetic member 40 and a strap 50. The housing 10 is provided with an adjusting cavity 11 and an adjusting opening 12 communicated with the adjusting cavity 11. The connecting rod 20 can be movably installed in the adjusting cavity 11 to move in the direction close to or away from the adjusting opening 12. The first magnetic member 30 is installed at the end of the connecting rod 20 to move synchronously with the connecting rod 20. The second magnetic member 40 is mounted on the housing 10 and at least partially located on one side of the first magnetic member 30 close to the adjusting opening 12. The parts of the first magnetic member 30 and the second magnetic member 40 facing each other are isotropic poles of each other, so that a magnetic repulsion force is generated between the first magnetic member 30 and the second magnetic member 40. One end of the strap 50 is connected to the connecting rod 20, and the other end of the strap 50 stretches out the adjusting opening 12 to expand and contract in the direction close to or away from the adjusting opening 12.

The housing 10 is rectangular or elongated. The adjusting cavity 11 extends along the lateral part of the housing 10, and the adjusting opening 12 is positioned at the end of the lateral part of the housing 10. The connecting rod 20 extends along the width direction of the adjusting cavity 11 and can move along the depth direction of the adjusting cavity 11. The inner end of the strap 50 is positioned in the adjusting cavity 11 and is connected to the connecting rod 20, and the outer end of the strap 50 is positioned outside the adjusting cavity 11 and is used for being connected to the device body 120. When the strap 50 is stretched outward, the connecting rod 20 is pulled in the direction close to the adjusting opening 12. When the connecting rod 20 moves in the direction far away from the adjusting opening 12, it also drives the strap 50 to shrink. The matching method of the connecting rod 20 and the housing 10 is not limited as long as they can be moved in the housing 10.

The first magnetic member 30 and the second magnetic member 40 can be implemented as magnets. When the connecting rod 20 is pulled by the strap 50 in the direction close to the adjusting opening 12, the first magnetic member 30 also moves synchronously in the direction close to the adjusting opening 12. The shape of the second magnetic member 40 is not limited as long as at least a part of the second magnetic member 40 is located at the end of the first magnetic member 30 that is close to the adjusting opening 12. That is, the part of the first magnetic member 30 facing the adjusting opening 12 also faces the second magnetic member 40 at the same time. And regardless of whether the first magnetic member 30 is close to or far away from the adjusting opening 12, the second magnetic member 40 is always partially positioned between the first magnetic member 30 and the adjusting opening 12. For example, a second magnetic piece 40 may be set up in a block shape and all adjacent to the adjusting opening 12. Because the parts of the first magnetic member 30 and the second magnetic member 40 in opposite directions are isotropic poles of each other, the second magnetic member 40 will produce a magnetic repulsion force to the first magnetic member 30. This magnetic repulsion force can drive the first magnetic member 30 away from the adjusting opening 12, that is, when the strap 50 is not stretched outward, the connecting rod 20 and the first magnetic member 30 are not subjected to the force facing outward along the adjusting opening 12; At this moment, the repulsive force generated by the second magnetic member 40 to the first magnetic member 30 can drive the first magnetic member 30 to move inward, so as to drive the connecting rod 20 to move inward, and then drive the strap 50 to shrink inward The contraction of the strap 50 can make the head-mounted adjustment device 110 and the device body 120 clamp the user's head. After clamping in place, the force applied onto the inner end of the strap 50 and the force applied onto the outer end can be balanced, so that the strap 50, the connecting rod 20 and the first magnetic member 30 all stay in the position.

Conventionally, the tightness of the head-mounted display device is mostly manually adjusted, and the adjustment process is very cumbersome. When the head-mounted display device is worn on the user's head, the user can feel whether the tightness is appropriate, and at this time the manual adjustment is very inconvenient. First, when the user is adjusting, the hand should be raised to the head. When the adjustment time is long, and the arm muscle is easy to fatigue. Second, the user cannot see the manual adjustment device, and the user needs to find the manual adjustment device and then adjust it based on impressions. It is indeed much more convenient if the user manually adjusts the tightness of the head-mounted display device before wearing. However, in the absence of a wearing feeling, the tightness obtained by such adjustment is very unsuitable for the user's head. Of course, after wearing the head-mounted display device to feel the tightness, the user can take it off, adapt to loosen or tighten, and then wear it again to check the tightness. In this way, it can indeed take into account the adjustment accuracy and hand load, but this adjustment is too cumbersome, and the adjustment time is too long.

In this embodiment, the head-mounted adjustment device 110 arranges a connecting rod 20, a strap 50, a first magnetic member 30 and a second magnetic member 40 in the housing 10; the homogeneous magnetic poles of the first magnetic member 30 and the second magnetic member 40 are facing each other; and the band 50 and the first magnetic member 30 are connected to the connecting rod 20. Thus, when the strap 50 is pulled outward by the tensile force of the connecting rod 20, the first magnetic piece 30 can move in the direction close to the adjusting opening 12 along with the connecting rod 20. Since the second magnetic member 40 is at least partially located on one side of the first magnetic member 30 close to the adjusting opening 12, the second magnetic member 40 will exert a repulsive force on the first magnetic member 30. When the strap 50 is stretched outward to the length of the user's head, the pulling force on the strap 50 is removed. At this moment, the second magnetic piece 40 will move inward under the action of repulsion, and the strap 50 will be pulled inward by the connecting rod 20. The outer end of the strap 50 is connected to the device body 120 of the head-mounted display device 100. When the strap 50 is pulled inward, the head-mounted adjustment device 110 cooperates with the device body 120 to clamp the user's head so as to realize the effect of automatically adapting to the user's head. After the device body 120 and the head-mounted adjustment device 110 are clamped into place, the repulsive force applied onto the first magnetic member 30 and the resistance force applied onto the outer end of the strap 50 will be balanced, so that the head-mounted adjustment device 110 and the device body 120 are stably worn on the user's head. As a result, when using the head-mounted display device 100, the user only needs to pull the strap 50 to a length greater than the size of the head. After the user wears the head-mounted display device 100, the strap 50 will be tightened in the adjusting cavity 11 under the effect of magnetic repulsion to clamp the user's user. As a result, the head-mounted display device 100 can be automatically adjusted after being worn without the need for manual operation by the user, and the convenience of using the headset 100 is improved.

In the following disclosure, the head-mounted adjustment device 110 will be illustrated in conjunction with the accompanying drawings.

Please refer to FIG. 4 and FIG. 5. FIG. 4 is a diagram of a partial structure of the head-mounted adjustment device 110 according to an embodiment of the present disclosure. FIG. 5 is a top view of a head-mounted adjustment device 110 according to an embodiment of the present disclosure. The housing 10 is provided with two adjusting cavities 11 and two adjusting openings 12. The two adjusting cavities 11 are arranged along the length direction of the housing 10, and the two adjusting openings 12 are arranged opposite to each other. Each adjusting cavity 11 is provided with the connecting rod 20, the first magnetic member 30 and the second magnetic member 40. The number of the straps 50 is two, and the two straps 50 are respectively connected to the two connecting rods 20 to stretch relative to the two adjusting openings 12 respectively.

The two adjusting openings 12 are arranged at two ends in the length direction of the housing 10, and two straps 50 are elastic through two adjusting openings 12 respectively. The position relationship and connection relationship of the first magnetic member 30, the second magnetic member 40, the connecting rod 20 and the strap 50 in the two adjusting cavities 11 are the same, so that the strap 50 can stretch out the two ends of the headset adjustment device 110 and be connected with the two ends of the device body 120. It can be understood that when the two straps 50 are all stretched, the elongation direction of the two straps 50 is opposite. The first magnetic members 30 in the two adjusting cavities 11 are opposite, and the moving directions of the connecting rods 20 in the two adjusting cavities 11 are also opposite. When the head-mounted display device 100 is worn on the user's head, the two straps 50 are close to the left and right sides of the user's head, respectively. Thus, the two straps 50 can be clamped to the user's head from multiple directions in conjunction with the housing 10 and the device body 120 to improve the wearing stability of the headset 100.

For example, please refer to FIG. 4. The head-mounted adjustment device 110 further comprises two friction-reducing pillars 73 installed at the adjusting opening 12. The two friction-reducing pillars 73 are arranged at an interval, and the straps 50 are positioned between the two friction-reducing pillars 73. The friction-reducing pillars 73 are used to avoid the contact friction of the periphery of the strap 50 directly in the adjusting opening 12, so that the resistance applied onto the strap 50 in the expansion and contraction process can be reduced, such that the expansion and contraction process of the strap 50 is smoother, and the friction damage to the strap 50 is reduced. The friction-reducing pillars 73 can be set as a cylinder to reduce the contact area with the strap 50 and further reduce the friction to the strap 50. The friction-reducing pillars 73 can also be set to be rotatably installed at the adjusting opening 12 places, so that when being scratched by the strap 50, it can rotate with the strap, so that the friction onto the strap 50 can be further reduced.

For example, please refer to FIG. 4 and FIG. 5. The second magnetic member 40 extends along the depth direction of the adjusting cavity 11, the first magnetic member 30 is located on one side in the width direction of the second magnetic member 40, and the length direction of the first magnetic member 30 is arranged at an angle with the extension direction of the second magnetic member 40. The second magnetic member 40 can be in the form of a straight strip or in the form of an arc strip, and is not limited herein. The extension direction of the second magnetic member 40 is parallel to the opening direction of the adjusting opening 12, and the length direction of the first magnetic member 30 is at an angle with the extension direction of the second magnetic member 40 and is also at an angle with the opening direction of the adjusting opening 12. That is, regardless of whether the first magnetic member 30 is near or far from the adjusting opening 12, the magnetic poles of the first magnetic member 30 are always inclined towards the magnetic poles of the second magnetic member 40, and the magnetic poles of the first magnetic member 30 and the magnetic poles of the second magnetic member 40 remain unchanged. And the magnetic field strength of the poles of the second magnetic member 40 is the same in the direction of extension. Therefore, no matter where the first magnetic member 30 is located, the direction and magnitude of the magnetic repulsion force applied onto the first magnetic member 30 are the same.

It can be seen from the force analysis that the repulsive force FO generated by the second magnetic member 40 onto the first magnetic member 30 can be decomposed into two component forces Fx and Fy, wherein the direction of the first component force Fx is parallel to the opening direction of the adjusting opening 12 and is oriented towards the inner side of the adjusting opening 12, and the direction of the second component Fy is perpendicular to the opening direction of the adjusting opening 12. By limiting the activity trajectory of the connecting rod 20, only the first component Fx can be used to promote the first magnetic member 30. That is, the connecting rod 20 is to be pushed inward.

That is, the connecting rod 20 will always be subjected to a sub-force that pushes inward in the adjusting cavity 11, so that the strap 50 connected to the connecting rod 20 always has the movement tendency of inward contraction. When the strap 50 receives the outward pulling force, as long as this pulling force is greater than the component force that the connecting rod 20 receives, the strap 50 can be stretched outward. When this pulling force is removed, the strap 50 automatically shrinks inward until the force on the inner and outer ends of the strap 50 is balanced. Thus, in the process of automatically contraction and adapting to the head size of the strap 50, the magnitude and direction of the force for contraction can be kept stable, so that the stability of the automatic adjustment process of the strap 50 can be improved.

As shown in FIG. 5, the second magnetic member 40 is arranged in an arc shape in the extension direction, the first magnetic member 30 is located on the concave arc side of the second magnetic member 40, and the movable trajectory of the first magnetic member 30 is the same as that of the second magnetic member 40. The shape of the second magnetic member 40 and the activity trajectory of the first magnetic member 30 and the connecting rod 20 are all arc-shaped. Surely, the housing 10 can also be arc-shaped, so that the housing 10 can be more consistent with the rear head curve of the human head. And the stretching and contraction trajectory of the strap 50 can also be more consistent with the head curve of the human head, thereby reducing the difficulty of automatic adjustment of the strap 50, and further improving the wearing stability of the head-mounted display device 100.

As shown in FIG. 4, the housing 10 further comprises a partition plate 60 installed in the adjusting cavity 11, and the partition plate 60 separates the adjusting cavity 11 into a first mounting cavity and a second mounting cavity. The connecting rod 20 and the strap 50 are positioned at the first mounting cavity, and the first magnetic member 30 and the second magnetic member 40 are located at the second mounting cavity. The partition plate 60 is provided with a guiding groove 61, and the guide through groove 61 extends along the movable direction of the connecting rod 20. One end of the connecting rod 20 extends into the second mounting cavity through the guiding groove 61 for the first magnetic member 30 to be connected.

The first magnetic member 30 can be movably connected to the partition plate 60, and the second magnetic member 40 is fixed on the partition plate 60. The guiding groove 61 extends along the depth direction of the adjusting cavity 11 to limit the activity trajectory of the connecting rod 20. Combined with the embodiment of the second magnetic member 40 extending along the depth direction of the adjusting cavity 11, the extension direction of the guiding groove 61 is parallel to the extension direction of the second magnetic member 40, so that the activity trajectory of the connecting rod 20 and the first magnetic member 30 is guaranteed to be parallel to the second magnetic member 40, so that the strap 50 can be stably stretched outward or contracted inward.

The adjusting cavity 11 is provided with two said partition plates 60. The two partition plates 60 separate the adjusting cavity 11 into the first mounting cavity and two said second mounting cavities. The first mounting cavity is positioned between the two second mounting cavities. The first magnetic members 30 and the second magnetic members 40 are arranged in the two second installation cavities, and the two partition plates 60 are provided with the guiding grooves 61. The two ends of the connecting rod 20 extend into the two second mounting cavities respectively through the two guiding grooves 61 to be connected with the two first magnetic members 30 respectively.

The two second mounting cavities are respectively arranged at the top and bottom of the adjusting cavity 11, and the two first magnetic members 30 and the connecting rod 20 play the role of mutual limiting, so that the connecting rod 20 and the two first magnetic members 30 are longitudinally fixed in the adjusting cavity 11. The repulsive forces applied onto the first magnetic members 30 in the two second mounting cavities have the same magnitude and direction, so that both ends of the connecting rod 20 can be subjected to some inward forces. Thus, the stress part of the connecting rod 20 is increased to avoid that a certain part of the connecting rod 20 is always stressed, so that the activity stability of the connecting rod 20 can be improved, and the contraction process of the strap 50 is more smoothly and stable.

Please refer to FIG. 6 and FIG. 7. FIG. 6 is an exploded diagram of a partial structure of the head-mounted adjustment device according to an embodiment of the present disclosure. FIG. 7 is a diagram of a magnified structure of the part B of the head-mounted adjustment device shown in FIG. 6. The head-mounted adjustment device 110 further comprises a sliding pillar 71 connected to the first magnetic member 30. The partition plate 60 is provided with a sliding groove 62. The sliding groove 62 is parallel to the guiding groove 61, and the sliding pillar 71 can be slidably matched with the sliding groove 62. The sliding pillar 71 is connected to one side of the first magnetic member 30 towards the partition plate 60, and the sliding pillar 71 and the first magnetic member 30 can be connected by bonding. When the first magnetic member 30 is moving, the sliding pillar 71 and the sliding groove 62 are slidably coordinated, so that the contact friction between the first magnetic member 30 and the partition plate 60 can be reduced, such that the frictional resistance applied onto the first magnetic member 30 can be reduced, and the friction damage to the first magnetic member 30 can be reduced simultaneously. The number of sliding grooves 62 can be two, and the two sliding grooves 62 are respectively located on both sides in the width direction of the guiding groove 61. The number and position of the sliding pillars 71 correspond to the sliding grooves 62, so that the activity stability of the first magnetic member 30 can be improved.

Please refer to FIG. 7. The head-mounted adjustment device 110 further comprises a roller sleeve 72. The roller sleeve 72 can be rotatably sleeved on the sliding pillar 71 to roll and fit with the sidewall of the sliding groove 62. The frictional force of rolling friction is less than that of sliding friction, so the frictional resistance applied onto the first magnetic member 30 can be further reduced, and the noise generated during the coordination of the sliding pillar 71 and the sliding groove 62 can be reduced simultaneously. The roller sleeve 72 can be made of elastic material to further reduce rolling noise and improve rolling stability.

In the above embodiments, the descriptions of each embodiment have their own emphasis, and the part that is not detailed in a certain embodiment may be referred to the relevant descriptions of other embodiments.

In the description of the present disclosure, the terms "first" and "second" are used for descriptive purposes only and should not be construed as indicating or implying relative importance or implying the number of technical features indicated. Thus, defining the "first" and "second" features may explicitly or implicitly include one or more features.

The above embodiments of the present disclosure provide a head-mounted adjustment device in detail, and the principle and embodiment of the present disclosure are described in this article by applying specific examples, and the description of the above embodiment is only used to help understand the method of the present disclosure and its core idea; At the same time, for those skilled in the art, according to the idea of the present disclosure, there will be changes in the specific embodiment and the scope of application, and in summary, the contents of this specification should not be understood as a restriction on the present disclosure.

What is claimed is:

1. A head-mounted adjustment device, comprising:

a housing, having an adjusting cavity and an adjusting opening connected to the adjusting cavity;

a connecting rod, movably installed in the adjusting cavity, configured to move in the direction close to or away from the adjusting opening;

a first magnetic member, installed at an end of the connecting rod to move synchronously with the connecting rod;

a second magnetic member, installed in the housing, wherein the second magnetic member is at least partially located on one side of the first magnetic member close to the adjusting opening; parts of the first magnetic member and the second magnetic member facing each other are isotropic magnetic poles of each other, so that the first magnetic member and the second magnetic member produce magnetic repulsion; and a strap, having one end connected to the connecting rod, and another end extends out of the adjusting opening to expand and contract in a direction close to or away from the adjusting opening.

2. The head-mounted adjustment device of claim 1, wherein the second magnetic member extends along a depth direction of the adjusting cavity, the first magnetic member is located on one side in a width direction of the second magnetic member, and a length direction of the first magnetic member is arranged at an angle with an extension direction of the second magnetic member.

3. The head-mounted adjustment device of claim 2, wherein the second magnetic member is arranged in an arc shape in the extension direction, the first magnetic member is located on a concave arc side of the second magnetic member, and an activity trajectory shape of the first magnetic member is identical as an activity trajectory shape of the second magnetic member.

4. The head-mounted adjustment device of claim 1, wherein the housing further comprises a partition plate installed in the adjusting cavity, and the partition plate separates the adjusting cavity into a first mounting cavity and a second mounting cavity; the connecting rod and the strap are positioned in the first mounting cavity, and the first magnetic member and the second magnetic member are located in the second mounting cavity; the partition plate is provided with a guiding groove, and the guiding groove extends along a moving direction of the connecting rod; and one end of the connecting rod extends into the second mounting cavity through the guiding groove for the first magnetic member to be connected.

5. The head-mounted adjustment device of claim 4, wherein the first magnetic member is movably connected to the partition plate, and the second magnetic member is fixed to the partition plate.

6. The head-mounted adjustment device of claim 4, wherein an extension direction of the guiding groove is parallel to the extension direction of the second magnetic member.

7. The head-mounted adjustment device of claim 4, further comprising:

a sliding pillar, connected to the first magnetic member; wherein the partition plate is provided with a sliding groove, the sliding groove is parallel with the guiding groove, and the sliding pillar and the sliding groove are slidably fitted.

8. The head-mounted adjustment device of claim 7, wherein the sliding pillar is connected to one side of the first magnetic member facing the partition plate, and the sliding post is connected with the first magnetic member by means of bonding.

9. The head-mounted adjustment device of claim 7, wherein a number of the sliding grooves is two, the two sliding grooves are arranged on two sides in the width direction of the guiding grooves, and the number and positions of sliding posts correspond to the sliding grooves.

10. The head-mounted adjustment device of claim 7, further comprising:

a roller sleeve, capable of being rotatably sleeved on the sliding post to roll and cooperate with a groove wall of the sliding groove.

11. The head-mounted adjustment device of claim 4, wherein the adjusting cavity has two partition plates, the partition plates separate the adjusting cavity into the first mounting cavity and two second mounting cavities, the first mounting cavity is located between the two second mounting cavities; the two second mounting cavities are provided with the first magnetic members and the second magnetic members, and the two partition plates are provided with the guiding grooves; the two ends of the connecting rod extend into the two second mounting cavities respectively through the two guiding grooves to be connected with the two first magnetic members respectively.

12. The head-mounted adjustment device of claim 11, wherein the two second mounting cavities are respectively arranged at a top and a bottom of the adjusting cavity, and the two first magnetic members and the connecting rod play a role of mutual limiting, so that the connecting rod and the two first magnetic members are longitudinally fixed in the adjusting cavity.

13. The head-mounted adjustment device of claim 1, wherein the housing is provided with two adjusting cavities and two adjusting openings, the two adjusting cavities are arranged along a length direction of the housing, and the two adjusting openings are arranged opposite to each other; each adjusting cavity is provided with the connecting rod, the first magnetic member and the second magnetic member; a number of the straps is two, and the two straps are respectively connected to the two connecting rods to expand and contract relative to the two adjusting openings respectively.

14. The head-mounted adjustment device of claim 13, wherein the two adjusting openings are arranged at two ends in a length direction of the housing, and the two straps are respectively extensible through the two adjusting openings.

15. The head-mounted adjustment device of claim 1, wherein the head-mounted adjustment device further comprises two friction-reducing pillars installed at the adjusting opening, the two friction-reducing pillars are arranged with an interval, and the straps are positioned between the two friction-reducing pillars.

16. The head-mounted adjustment device of claim 15, wherein the friction-reducing pillars can be rotatably mounted at the adjusting opening.

17. The head-mounted adjustment device of claim 1, wherein the adjusting cavity extends along a lateral extension direction of the housing, the adjusting opening is located at a lateral end of the housing, and the connecting rod extends along a width direction of the adjusting cavity and is capable of moving along a depth direction of the adjusting cavity.

18. The head-mounted adjustment device of claim 1, wherein the first magnetic member and the second magnetic member are magnets.

19. The head-mounted adjustment device of claim 1, wherein the second magnetic member is block-shaped and adjacent to the adjustment opening.

20. A head-mounted display device, comprising a head-mounted adjustment device as claimed in claim 1.

* * * * *